United States Patent [19]
Lautenschlaeger et al.

[11] Patent Number: 5,234,730
[45] Date of Patent: Aug. 10, 1993

[54] ADHESIVE COMPOSITION, PROCESS, AND PRODUCT

[75] Inventors: Friedrich K. W. Lautenschlaeger; Reynaldo G. Bumanlag, both of Mississauga, Canada; James A. Box, Broadview Heights, Ohio

[73] Assignee: Tremco, Inc., Beachwood, Ohio

[21] Appl. No.: 594,256

[22] Filed: Oct. 9, 1990

Related U.S. Application Data

[60] Continuation of Ser. No. 315,072, Feb. 23, 1989, Pat. No. 4,965,117, which is a division of Ser. No. 928,753, Nov. 7, 1986, Pat. No. 4,814,215.

[51] Int. Cl.$^5$ .................. B32B 3/06; B32B 31/28
[52] U.S. Cl. .................. 428/34; 156/109; 156/273.5; 156/275.5; 428/81
[58] Field of Search .......... 428/40, 214, 343, 345, 428/349, 352, 355, 356, 906, 34, 81; 523/176; 156/331.8, 273.5, 275.1, 275.5, 109

[56] References Cited

U.S. PATENT DOCUMENTS

| | | | |
|---|---|---|---|
| 2,895,950 | 7/1959 | Krieble | 260/39.5 |
| 3,328,194 | 6/1967 | Kasper | 117/62 |
| 3,625,875 | 12/1971 | Frauenglass | 260/17 |
| 4,092,374 | 5/1978 | Douek | 260/873 |
| 4,272,589 | 6/1981 | Dubois | 428/442 |
| 4,287,255 | 9/1981 | Wong | 428/343 |
| 4,306,954 | 12/1981 | Wendling | 428/500 |
| 4,323,591 | 4/1982 | Wendling | 427/53.1 |
| 4,407,856 | 10/1983 | Pitts | 427/44 |
| 4,470,858 | 9/1984 | McMaster | 156/103 |
| 4,500,629 | 2/1985 | Irving | 523/176 |
| 4,533,446 | 8/1985 | Conway | 522/90 |
| 4,552,604 | 11/1985 | Green | 428/345 |
| 4,684,538 | 8/1987 | Klemarczyk | 427/54.1 |
| 4,950,344 | 8/1990 | Glover | 156/109 |
| 4,965,117 | 10/1990 | Lautenschalaeger | 428/355 |

FOREIGN PATENT DOCUMENTS

| | | | |
|---|---|---|---|
| 60-27628 | 2/1985 | Japan | 428/34 |
| 1-08351 | 6/1985 | Japan | 428/34 |

Primary Examiner—Jenna L. Davis
Attorney, Agent, or Firm—Konrad H. Kaeding; Alfred D. Lobo; David P. Dureska

[57] ABSTRACT

Command-cure compositions especially for use in insulated window assemblies permit the composition to be rendered adhesively bonding at a selected time interval after formation of the assembly to firmly bond opposed surfaces of the assembly; a particular adhesive in strip or tape form comprises an adhesive polymer composition which is transparent to curing radiation especially UV, and curable in the presence of the radiation; the curing is inhibited by oxygen; the composition is solvent free and cures to a mass resistant to water; surfaces of the adhesive exposed to oxygen remain tacky and uncured; the adhesive is especially useful in window structures in which adhesion of the tacky surface excludes the cure-inhibiting oxygen and the tacky surface can be cured by UV radiation passing through the window glass.

12 Claims, 4 Drawing Sheets

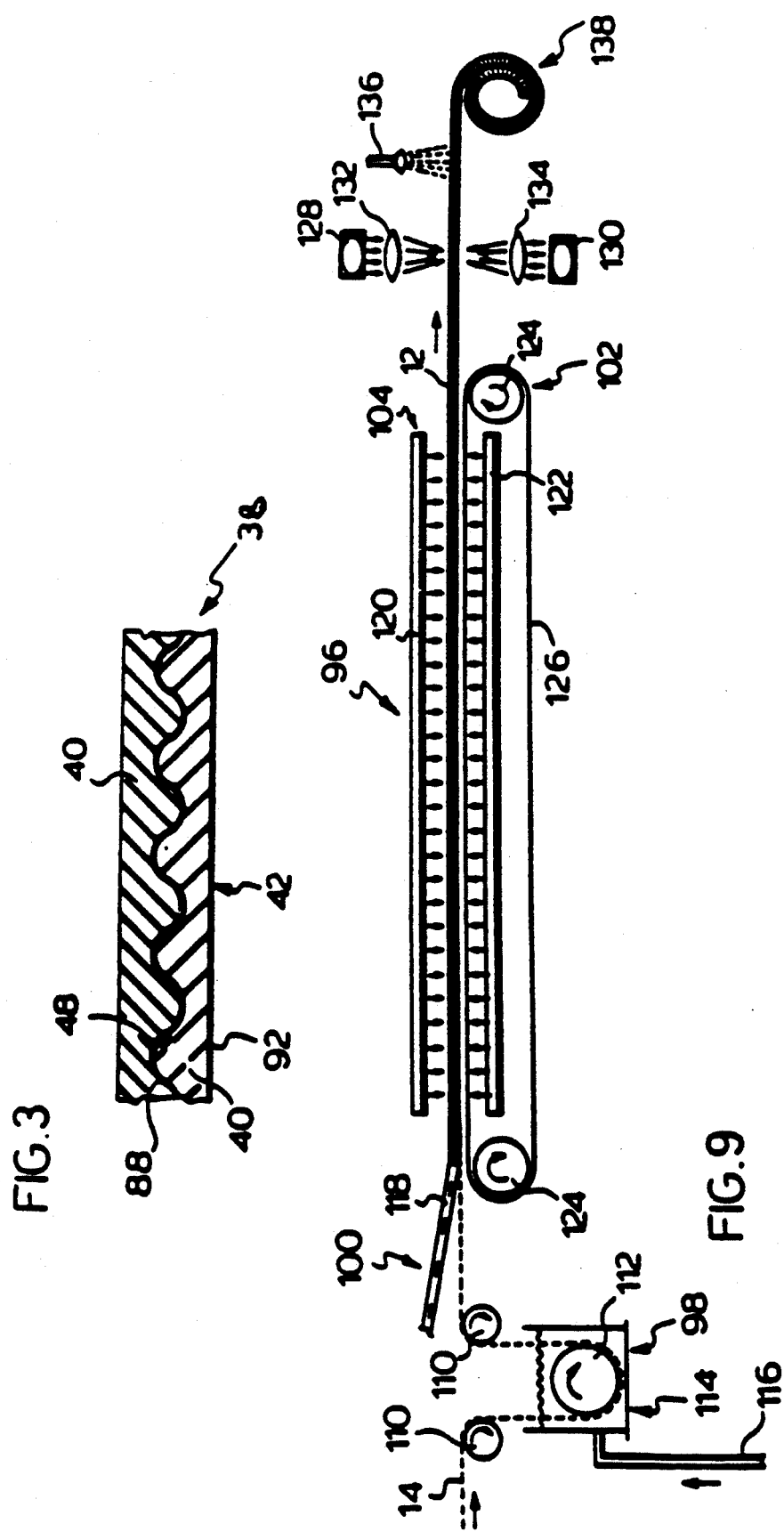

ADHESIVE COMPOSITION, PROCESS, AND PRODUCT

This is a continuation of U.S. Ser. No. 315,072 filed Feb. 23, 1989, now U.S. Pat. No. 4,965,117, which is a divisional of U.S. Ser. No. 928,753, filed Nov. 7, 1986, now U.S. Pat. No. 4,814,215.

BACKGROUND OF THE INVENTION i) Field of the Invention

This invention relates to adhesive compositions and products, and to the manufacture of such compositions and products, more especially the invention is concerned with an adhesive composition which can be cured on command or at a desired point in time, and products based on the composition; in particular the invention is concerned with a composition curable by curing radiation, but in which the surface cure is inhibited by oxygen.

ii) Description of the Prior Art

Adhesive compositions are employed in a variety of environments in which a bond or seal is to be formed between two closely spaced surfaces, and in the manufacture of laminates of different materials. They may be applied in a flowable form, for example, as a liquid, and allowed to cure or set to a solid mass in situ; or they may be applied in a tape form in which the adhesive composition forms a coating or layer on a supporting substrate or film.

Such compositions are usually multi-component formulations in which two or more components are admixed at the time of use whereafter chemical reaction between the components to form a cured composition commences. If the cure proceeds rapidly the formulation must be employed without delay. If cure retardants are employed to delay or retard the cure, prolonged periods are required to complete the cure, and in some cases this means that the product must be stored in a controlled atmosphere over a period of days to allow the cure to complete.

Various mastic products, for example, sealants and preformed tapes and strips are known for mounting window glass. These mastic products are employed to bond sheets of window glass together adjacent their peripheral edges, in spaced apart relationship with an air space therebetween; they are also employed as bonding mediums and sealants between the window glass and the supporting frame structure which is typically of metal.

The problems associated with retarded cure of adhesives are experienced in the window industry with these mastic products wherein stacks comprising pairs of bonded together window glass must be stored for several days to allow the cure to complete.

These mastic products contain a solvent and are flowable, uncured polymer materials. The flowable nature presents handling problems and may also result in undesirable migration of the polymer material across the window glass surface, which is aesthetically unacceptable.

In addition to their adhesive character, these mastic products are required to display other characteristics having regard to the environment in which they are to be used. Thus mastic products employed as sealants in window structures should be weather resistant and impermeable to moisture and water.

SUMMARY OF THE INVENTION

It is an object of this invention to provide a method of bonding layers, especially glass layers in which a non-bonding polymer composition is rendered adhesively bonding at a selected time interval after introduction of the non-bonding polymer composition between the layers.

It is a further object of this invention to provide compositions and products, including tape products, for carrying out such method.

It is still another object of the invention to provide new adhesive compositions and products containing them which are substantially solvent free.

The invention is more especially concerned with adhesive compositions, products and methods for use in window structures.

The invention contemplates a method and composition which provides a so-called "command-cure" of a non-bonding polymer composition, whereby the composition is rendered adhesively bonding.

The expression "command-cure" contemplates that an otherwise non-bonding-polymer composition is rendered adhesively bonding at a selected point in time. The point in time is chosen by the user of the composition.

In one embodiment the non-bonding polymer composition is rendered adhesively bonding by affecting a cure of the composition, however, other techniques whereby a non-bonding polymer composition is rendered adhesively bonding, and which do not involve a cure, are also contemplated. A technique involving a temporary change in the physical state, for example, melting or temporary reversal of crystallinity, of the non-bonding polymer composition whereby it becomes adhesively bonding, and is thereafter restored to its original state while maintaining the adhesive bond is also contemplated by the invention.

The expression "non-bonding polymer composition" contemplates a composition in a state in which it does not form a firm adhesive bond sufficient to permanently secure two layers together; the composition may, however, be sufficiently adhesive or tacky to form a weak bonding between layers, sufficient as a temporary holding means during careful assembly and handling. The expression "adhesively bonding" contemplates a composition in a state in which it forms a firm, substantially permanent bond.

Thus in one aspect the invention provides a method of bonding self-supporting layers in opposed facing relationship which comprises introducing a non-bonding polymer composition adapted to be rendered adhesively bonding between opposed surfaces of the layers to form an assembly and subsequently rendering the composition adhesively bonding at a selected time interval after formation of the assembly to firmly bond together the opposed surfaces of the layers.

In another aspect of the invention there is provided a composite of such layers bonded together.

In accordance with another aspect of the invention there is provided an adhesive polymer composition which is transparent to curing radiation, and curable in the presence of such curing radiation, the curing being inhibited by oxygen. In particular the composition is substantially solvent free and when cured is substantially resistant to water.

In one embodiment there is provided an adhesive polymer strip formed from the composition. The strip has a shaped body portion and at least one exposed surface portion; the composition is substantially cured throughout the body portion and uncured at the exposed surface portion such that the surface portion remains tacky.

In another embodiment of the invention there is provided a flexible adhesive tape in which the adhesive polymer composition is present as an adhesive layer on a flexible substrate. The adhesive layer has a shaped body portion and a first outer surface portion remote from the substrate; the composition is substantially cured throughout the body portion and uncured at the first outer surface portion, so that such outer surface portion remains tacky.

In another embodiment of the invention there there is provided a flexible sealant strip comprising: a deformable substrate and an adhesive layer supported on said substrate, said adhesive layer having a body portion and a first outer surface, a spacer element extending between opposed sides of said tape effective to resist compressive forces applied to said substrate, said adhesive layer being transparent to curing radiation and comprising an adhesive polymer composition curable in the presence of the curing radiation, the curing being inhibited by oxygen, said composition being substantially cured throughout said body portion and uncured at the first outer surface portion, such that said first outer surface portion remains tacky.

In another embodiment there is provided a laminate which comprises first and second self-supporting layers substantially opaque to curing radiation, in opposed facing relationship and an adhesive layer of the adhesive composition therebetween. The adhesive layer has a pre-shaped body portion and opposed first and second outer surface portions in contacting relationship with the self-supporting layers. The adhesive layer is substantially cured throughout the body portion, and at least partially uncured at the outer surface portions, such that the outer surface portions are sufficiently tacky to provide adhesion between the self-supporting layers and the adhesive layer.

In still another embodiment of the invention there is provided a sealant which comprises the adhesive composition in pumpable form having a viscosity of at least 50,000 cps, and preferably at least 100,000 cps, measured at 25° C. effective to render the composition non-sagging in the pumpable state when applied in a thickness of at least 0.0625 inches. In particular the viscosity may be achieved by partial curing of the composition.

In yet another embodiment of the invention there is provided a method of producing an adhesive composition transparent to and curable by curing radiation, the curing being inhibited by oxygen, comprising reacting a long chain polymer material having a plurality of non-terminal side functional groups with a side chain-forming compound having a first end functional group which is reactive with the side functional group, and a second end vinyl group remote from the first end functional group, to form a long chain polymer material having a plurality of short pendant side chains, with terminal vinyl groups, and admixing the long chain polymer material with a cross-linking agent effective in the presence of curing radiation and absence of oxygen to form cross-linking bridges containing the vinyl groups.

The modified polymer material bearing side chain terminal vinyl groups is flowable, by which is meant that the material is liquid or mobile or can be rendered liquid or mobile at moderate elevated temperatures such that the mixture of modified polymer material, cross-linking agent and other optional additives can be extruded, cast, coated or otherwise applied to a substrate surface.

DESCRIPTION OF PREFERRED EMBODIMENTS i) Command-Cure

By means of the invention an assembly of two windows, for example, glass or plastic windows, can be formed in which the opposed faces of the windows are held together with the non-bonding polymer composition therebetween, adjacent peripheral edges of the windows, the windows being separated to provide an insulating space therebetween.

The assembly may rely on the tacky nature of at least the surface of the composition to temporarily hold the windows together in opposed facing relationship, and thereafter, at a selected time, the composition may be rendered adhesively bonding to firmly bond the windows together in their opposed facing relationship. The adhesive bonding character may be triggered in several ways, for example, heat, U.V. radiation or microwave radiation.

In accordance with the invention a number of techniques have been developed to provide the "command-cure" feature:

a) Photo-cure Adhesives

These adhesives are cured in the presence of ultraviolet radiation and the absence of oxygen. Thus a shaped flexible strip may be formed which is cured throughout its body but tacky and uncured at a surface exposed to oxygen. The tacky surface is applied to a glass surface thereby excluding oxygen. Exposure of the uncured tacky surface to ultra-violet radiation, at a selected time, results in rapid cure at the surface of the shaped strip to form a firm adhesive bond between the glass surface and the strip. The ultra-violet radiation for the "command-cure" is suitably directed through the glass or through the material itself.

The photo-curable adhesives or sealants are in particular, acrylates which polymerize by a free radical mechanism initiated by ultra-violet light. The compounding ingredients employed should suitably be transparent to ultra-violet light in the U.V. range of the spectrum, especially the 300 to 400 nanometer range with particular attention to 365 nanometers which is the frequency of most industrial U.V. ovens.

Adhesives or sealants made with photo-sensitive monomers can be used in two manners:
i) The entire adhesive or sealant may be comprised of a compounded acrylate.
ii) The acrylate may be coated on a carrier, for example, a pre-cured butyl, neoprene and EPDM rubber which serves as the main body of the sealant system and derives its adhesion from the photo-sensitive material which is coated onto the contacting surfaces prior to assembly of the insulating glass unit. This can be done either at the time of manufacturing of the sealant system or by the user of the system at the time of application.

Employing system ii) a composite comprising the acrylate coated on a carrier is applied to an insulating glass assembly and cured by exposing the assembly to an ultra-violet light source. This cure is effected in a matter of seconds or minutes depending on the concentration of the light source.

The photo-sensitive adhesive may also be applied to the normal spacer bar, typically of aluminum, used in fabricating an insulating glass unit. Cure may then be effected by exposure to an RS-1 sunlamp for fifteen minutes.

b) Capped Urethanes

Curing of a urethane-forming composition based on an isocyanate and a compound, for example, a polyol, containing active hydrogen atoms for reaction with the isocyanate to form the urethane, is blocked by capping the isocyanate chemical with a blocking or capping agent, for example, nonyl phenol, which can be removed to liberate the isocyanate groups at relatively mild elevated temperatures, for example, 115° C.

Thus by blocking the activity of toluene diisocyanate (TDI) with a capping agent, for example, nonyl-phenol it is possible to introduce the curing capability of TDI into a urethane pre-polymer and retain storage stability. When the adhesive or sealant mixture is heated to a moderate temperature the nonyl-phenol splits off from the TDI and permits it to effect the normal curing process of a urethane.

The composition may be employed as a coating on spacer members or the like disposed between pairs of glass windows to form a window assembly. The assembly is heated to remove the capping agent fromthe isocyanate whereafter the curing proceeds to form a firm urethane adhesive bond.

c) Anaerobic Cure

Compositions of this type cure in the absence of oxygen to form a firm adhesive bond. They may be employed as a coating as in the case of the capped urethanes. On exclusion of oxygen, as when the coated spacer is sandwiched between opposed glass surfaces, the cure will commence to form a firm adhesive bond.

the anaerobic family of adhesives or sealants is somewhat similar to the U.V. curables in that they may be applied either at the time of manufacture or at the time of application. That is to say, a coating of anaerobic adhesive can be applied to a carrier of, for example, butyl, EPDM or neoprene rubber extrusion by the sealant manufacturer or by the fabricator of insulating glass at the time of manufacture.

The cure is effected by exclusion of oxygen from the space occupied by the anaerobic adhesive. This triggers a latent cure.

The use of an anaerobic system offers the advantage that external energy, for example, heat or light, is not necessary.

In one embodiment anaerobic adhesive was coated directly on the conventional spacer bar, typically of aluminum, of a window assembly. Later, the insulating glass assembly was completed using two lites of glass on either side of the spacer bar. The only "trigger" required is to press the glass intimately with the spacer bar which results in exclusion of oxygen and effects chemical cure of the anaerobic coating. The same procedure was also used in coating an elastomeric carrier of EPDM, butyl and neoprene rubbers in place of the aluminum spacer bar and effecting the latent cure by pressing the assembly together to exclude oxygen.

d) Melt-Crystallinity

Reliance can be made on the temporary change in physical characteristics produced by heat. A neoprene strip can be employed in the manner of the photocure adhesive above.

The assembly of strip and glass panes is subjected to heat or microwaves sufficient to raise the temperature so that the neoprene melts at the surface and will then wet the glass surface. In order to achieve this the surface of the neoprene must be raised to the crystallinity temperature. Upon cooling the neoprene recrystallizes to form a firm adhesive bond with the glass surface.

Neoprene is especially suitable because it has a low temperature requirement for reversing crystallinity. Nitrile films which cure as a result of heat pressure may also be used.

Neoprene (chloroprene) rubber is available in grades which are quite crystalline. This crystallinity is completely thermally reversible. At normal ambient conditions the elastomer is rubber-like in nature in large part due to its crystalline structure. As the temperature approaches or exceeds 158° F. the elastomer looses its crystalline structure and becomes thermoplastic. This renders it easily compressible and with suitable incorporation of other ingredients a tacky, adhesive extrusion can be made.

A mastic based on neoprene and additives may be extruded and used as the spacer between two lites of glass. The insulated glass assembly may then be heated by passing it through an infrared oven to a temperature of 165° F. At this temperature the neoprene extrusion is easily compressed by passing it through a series of compression rollers. After the assembly cools down to ambient condition, the crystallinity of the neoprene returns and an elastomeric bond is obtained between the spacer and the lites of glass.

This system is not a true chemical cure but because of the reversible crystallinity, the same effect results as if it was chemically cured. The same procedure can be obtained using other elastomers, for example, styrene-butadiene elastomers such as those marketed under the Kraton trade mark of Shell and the Vamac (trade mark of Dupont) elastomers.

e) Plastisols

Plastisols can be rendered adhesive by incorporation of silanes and can be modified to make them elastomeric with liquid nitrile rubber.

Shaped strips may be formed by extruding the plastisol with a fibrous material, for example, cellulosic fibres or asbestos fibre. The "cure" is produced by heat or microwave radiation which produces a change in the physical state to provide a firm adhesive bond.

Plastisols are compounds made up of polyvinylchloride and/or polyvinylchloride-polyvinylacetate resins dispersed in suitable plasticizers, for example, phthalates, aliphatic petroleum oils and polymeric polyesters. To this dispersion other ingredients may be added to obtain desirable properties, for example, calcium carbonate for reinforcement and for cost considerations, silanes for their adhesive properties, pigments for color, scavengers for chloride ions, for example, calcium oxide, epoxys and oxides of lead for stabilization.

Mixtures of the ingredients are suitably made to a desired consistency for application, for example, by gunning through a pumping system or by pre-extruding into tape for placement into an insulating glass assembly at a later time.

The plastisols remain "uncured" until sufficient heat is applied permitting the solution of the vinyl resins by the plasticizers. Once such solution takes place, the plastisol changes its characteristics from a deformable mastic to a permanently elastomeric rubber-like material. A typical heat cycle to effect this flux is 325° F. for 15 minutes but this is adjustable dependent on the mass of the sealant and insulating glass components.

f) Bound Moisture

A particulate molecular sieve material having bound water is dispersed throughout a formulation which cures in the presence of water. Exposing the material to heat or microwave radiation releases the water from the molecular sieve into the formulation to effect the cure.

g) Epoxy Cure

Expoxy resins can be employed in a heat activated command cure.

There are many heat activated curing systems for epoxy resin based sealants. One of the most reliable involves the use of dicyandiamide (Dicy) and a polymeric epoxy. A blend of epoxy powdered dicy and pigment forms a shelf stable sealant which cures only at elevated temperatures, typically being cured in 15 minutes at 350° F.

h) Butyl-Chlorobutyl

Latent cure systems are possible with butyl and chlorobutyl elastomers. The triggering means is the application of heat. The cure system can be based on chloro or bromophenolic resins. These can be compounded with the base elastomer and will remain relatively stable for a day or weeks depending on storage conditions. The adhesive or sealant can be either pumpable or in the form of an extruded tape.

ii) Radiation-Curable Adhesive Composition

Radiation-cure adhesive, especially photocure adhesives, represent an especially preferred form of command-cure adhesives.

The adhesive composition is, in particular, a polymer composition comprising an adhesive mixture of a long chain polymer material modified by the introduction of short pendant side chains, which side chains have terminal vinyl groups, and a di- or poly-functional cross-linking agent effective to react with the vinyl groups under appropriate conditions whereby bridges are formed between vinyl groups in different polymer chains to cure the modified polymer material.

In particular, the cross-linking occurs in the presence of curing radiation, and the cross-linking or curing is inhibited by oxygen.

The modified polymer and the cross-linking agent are selected such that an uncured mixture forming the adhesive composition is transparent to the curing radiation to a depth of up to 1.0, more generally up to 0.75 inches. This means that the composition is transparent to the radiation for a depth up to 1.0 inches measured from the surface of the composition on which the radiation is incident; this depth is referred to herein as the transparent depth.

More especially the composition will have a transparent depth of not more than 0.5 inches and typically not more than 0.25 inches.

The thickness of the composition which can be cured is proportional to the transparent depth. In particular, the maximum thickness of composition which can be cured is twice the transparent depth of the composition, for the case in which a layer or coating of composition is exposed to the curing radiation from opposite sides of the layer or coating.

Thus the composition can be maintained in the uncured state by excluding the curing radiation, for example, by maintaining the composition in an enclosure opaque to the curing radiation.

The curing of the composition is inhibited by oxygen and so the presence of oxygen dissolved in or otherwise occluded or entrained within the composition is to be avoided. In this regard the composition is suitably substantially free of gaseous oxygen. In so far as the outer surface portion of the composition is open to the atmosphere and thus exposed to oxygen gas, the outer surface portion of the composition will remain tacky even though the body portion is cured under the action of curing radiation penetrating the composition. The tacky surface portion can be adhered to a surface of a substrate so that access of oxygen to the surface portion is excluded. If curing radiation is able to penetrate to the tacky surface, either through the substrate, if it is transparent to the curing radiation, or through the body portion of the cured composition in so far as it is transparent to the radiation, the tacky outer surface portion will be cured. If the substrate is opaque or if, in any event, the tacky portion is not exposed to the curing radiation, it will remain tacky.

The composition suitably has a viscosity of at least 50,000 cps and preferably 100,000 cps at 25° C. and is pumpable. The composition is non-sagging in the pumpable state when applied in a thickness of at least 0.0625 inches. By non-sagging is meant that the composition can be applied in the pumpable state between a window pane and supporting frame separated by a spacing of at least 0.625 inches, and the composition will fill the space and not flow out.

The composition may contain conventional additives to impart known, desired characteristics, for example, adhesion promoters, plasticizers, photo-initiators, stabilizers, pigments and fillers.

a) Unmodified Polymer

In particular, the unmodified polymer is a long chain polymer material having a M.W. of 2,000 to 100,000, preferably 10,000 to 60,000, and may, in particular, be an acrylate polymer having a plurality of side functional groups selected from carboxyl, hydroxyl, mercapto, acrylonitrile or acrylamide.

Particularly suitable unmodified polymer materials are copolymers, terpolymers and tetrapolymers based on acrylic monomers. Suitable monomers include ethylacrylate, butylacrylate, 2-ethylhexylacrylate, β-carboxyethylacrylate, hydroxypropylacrylate, acrylic acid and acrylonitrile.

b) Modified Polymer

In accordance with the invention the unmodified polymer is modified at the side functional groups to introduce the short pendant side chains bearing the terminal vinyl groups.

The introduction of the short pendant side chains is achieved by a reagent having, on a molecular level, a functional radical at one end of the molecule which will react with a side functional group of the unmodified polymer, and a vinyl group at the other end of the molecule.

The vinyl group in the reagent is preferably an acrylate group. The functional radical reactive with the side functional groups may, in particular, be an epoxy, hydroxy, isocyanate or aziridinyl radical, or a carboxylate of a polyvalent metal.

Suitable reagents include glycidyl methacrylate; zinc diacrylate or dimethacrylate; zinc (hydroxy)acrylate; calcium diacrylate or dimethacrylate; chromium (III) diacrylate or dimethacrylate; zirconium diacrylate or dimethacrylate; tributyl tin acrylate and 2-(1-aziridinyl) ethyl methacrylate, and a reaction product of a diisocyanate and a hydroxyalkylacrylate, for example, methylene-bis-cyclohexyl isocyanate hydroxyalkyl acrylates, for example, hydroxypropyl acrylates.

Thus the modifying reagent may be a metal di- or triacrylate or a metal hydroxy acrylate of formula (I):

$$(HO)_mMe^xA_n \qquad (I)$$

in which Me is a metal, A represents an acrylate radical, x is an integer of at least 2, n and m are both integers of at least 1 and n+m=x.

The modifying reagent may be an epoxy compound of formula (II):

in which A is as defined above and p is an integer of at least 1.

The modifying reagent may also be an aziridinyl compound of formula (III):

in which A and p are as defined above.

The modifying reagent may also be an acid of formula (IV):

$$A-(CH_2)_pCOOH \qquad (IV)$$

wherein A and p are as defined above.

The modifying reagent may also be an isocyanate of formula (V) or (VI):

$$OCN-R^1-A \qquad (V)$$

$$OCN-R^1-NHCOO-R^2A \qquad (VI)$$

wherein $R^1$ and $R^2$ are the same or different and are aliphatic, cycloaliphatic or aromatic structures containing one or more rings; for example, alkylene, cycloalkylene or arylene having a carbon atoms range of 2 to 18.

In particular the acrylate radical A is of formula (VIII):

in which R is a hydrogen atom or alkyl of 1 to 4 carbon atoms, preferably methyl.

c) Cross-Linking Agent

The cross-linking is effected with a polyfunctional cross-linking agent in which the functional groups react with vinyl groups. A di-functional cross-linking agent will react with pairs of vinyl groups, more especially pairs in which the vinyl groups are in different or separate polymer chains of the polymer material. A trifunctional cross-linking agent can react with up to three such vinyl groups.

By appropriate selection and amount of the cross-linking agent, flexible cross-linking bridges can be formed to cure the modified polymer material to form a resilient or flexible cured adhesive polymer.

The cross-linking agent and terminal vinyl groups are selected such that the curing requires curing radiation, and the complete curing is inhibited by oxygen.

The cross-linking agents are, in particular, selected to match the modified polymer material having regard to the desired characteristics of the adhesive. Particularly suitable cross-linking agents for use with the acrylate based polymers are di- and tri-acrylates. In this way flexible bridges are formed between the polymer chains which produce resilience and flexibility which is a desirable characteristic for many applications including the mounting of window glass.

Furthermore the di-, tri-, or polyfunctional cross-linking reagent preferably of acrylate functionality, may react with a reactive diluent, for example, a monoacrylate such as caprolactone acrylate or plasticizer and the acrylate functionality of the modified polymer material under radiation conditions to give a cross-linked network of the desirable physical properties. Typical examples of difunctional acrylates are: ethylene glycol diacrylate; diethylene glycol diacrylate; tetramethylene glycol diacrylate; polyethylene glycol diacrylate; 1,3-butylene glycol diacrylate; 1,4-butanediol diacrylate; dimethylene glycol diacrylate; 1,6-hexanediol diacrylate; 2,2-dimethylpropane-1,3-diacrylate; tripropylene glycol diacrylate; ethoxylated bis-phenol-A-diacrylate; zinc diacrylate; and their dimethacrylate homologues.

Typical trifunctional acrylates are: trimethylolpropane triacrylate; ethoxylated trimethylolpropane triacrylate; and pentaerythritol triacrylate.

Typical polyfunctional acrylates are: pentaerythritol tetraacrylate; dipentaerythritol monohydroxy pentaacrylate.

Glycidyl methacrylate, glycidyl acrylate and 2-(1-aziridinyl) methacrylate are suitable as polyfunctional acrylates in the presence of chemical species which polymerize the three-membered rings.

The cross-linking agent may also be selected from higher molecular weight acrylates, for example, the so-called urethane acrylic oligomers prepared from di- or tri-functional alcohols (diols and triols) after reaction with excess diisocyanate to give a tri-functional isocyanate and conversion of the isocyanate groups with hydroxyethylacrylate or hydroxypropylacrylate to provide the desired acrylate functionality.

Isocyanate functionality can be introduced with aromatic or aliphatic diisocyanates. Residual isocyanate functionality on these polymers can lead to desirable cross-linking with polyhydroxy components in the formulation. This can be advantageous in applications where the depth of light-initiated cure in the preferred case of cure by UV radiation, is not sufficient or when adhesion to a substrate is required which contains surface functionalities reactive with isocyanates. Such reactive polymers are difunctional, but essentially monofunctional with respect to their isocyanate or acrylate groups; that is, each polymer contains on average one acrylate and one isocyanate group. Similarly, a fraction of the number of the acrylate functionality of the tri- or tetraacrylates can be isocyanate functionality. To increase the efficiency of these isocyanates, conventional catalysts such as tertiary amines can be included in the formulation, or as part of the initiator.

Such isocyanates can also be effective when the polymers contain hydroxy functionality, either as the result of the polymer modification or by using initiators for the polymerization which introduce hydroxy functionality.

The acrylate polymers can be based on polyesters or polyethers with terminal hydroxy functionality or similar polymers with more than two hydroxy groups.

The pendant vinyl groups of the modified polymer themselves permit radiation cross-linking, so that the addition of a di- or polyfunctional cross-linking agent may not be required, depending on the properties, for example, flexibility, desired. For example, when acrylates are used as polymer modifying agents, radiation cross-linking may occur even if the polyfunctional cross-linking agent is not present.

d) Curing Radiation

The curing radiation is suitably UV radiation having wavelengths of between 250 and 800 nm, preferably between 250 and 450 nm. However, electron beam radiation, microwave and heat radiation may also be employed as curing radiation although these are less preferred.

e) Additives

The compositions may contain one or more conventional additives depending on the physical characteristics required including adhesion promoters, plasticizers, photoinitiators, stabilizers, pigments and fillers.

Adhesion promoters are materials which increase the adhesion of the cured product to various surfaces such as glass and metals. Adhesion promoters can be added to the composition or can be co-polymerized into the polymer material.

Typical examples are: acrylic acid, β-carboxyethyl acrylate, silanes and titanates.

The adhesion promoters may also be applied to the surface on which the composition is to be applied. It may also be appropriate to apply an adhesion promoting primer, for example, acrylate, amino and mercapto-functional silanes, for example, mercaptopropyl trimethoxysilane and aminopropyl trimethoxysilane and a mixture of aminopropyl trimethoxysilane and a copolymer of butylacrylate-acrylic acid (60:40).

Plasticizers are reactive diluents which increase the flexibility of the cured product particularly at low temperatures. The materials selected are those which can be chemically bound into the network so that the product contains a minimum level of volatile components. Typical examples of such reactive diluents are: isodecyl acrylate, isobornyl acrylate, dicyclopentenyloxyethyl acrylate, cyclohexyl acrylate, tetrahydrofurfuryl acrylate, lauryl acrylate, 2-ethoxyethoxyethyl acrylate, phenoxyethyl acrylate, 2-(1-aziridinyl)-ethylmethacrylate, N-vinyl-2-pyrolidone, N-isobutoxymethyl acrylamide.

Photo-initiators are used to increase the rate of cure in the case of cure by UV radiation. The choice of photo-initiator depends on several factors, such as the light source, the presence of fillers in the formulation, and the desirable colour of the product. Typical examples are: benzophenone, 2,2-diethoxyacetophenone, diethoxyphenylacetophenone, IRGACURE 184, (trade mark of Ciba-Geigy for 1-hydroxycyclohexyl phenyl ketone), IRGACURE 907 (trade mark of Ciba-Geigy for 2-methyl-1-[4-(methylthio)phenyl]-2-morpholinopropanone-1), SANDORAY 1000 (trade mark of Sandoz), DAROCURE 1173 (trade mark of E. M. Chemicals), UV Absorber 0505 (Van Dyke & Co.), CYRACURE UVI-6990 (trade mark of Union Carbide).

Combinations of initiators and sensitizers can lead to synergistic effects. Particularly effective are combinations of aryl ketones and a tertiary alkanolamine such as N-methyldiethanolamine. Alternatively, the photoinitiator may contain both functional groups. Other co-initiators are methylthioxanthone and the ethyl ester of p-dimethylaminobenzoic acid.

If the photo-initiator is insoluble in the acrylate, it may be advisable to dissolve it in a component of the formulation rather than in the total mixture to be photocured.

Stabilizers improve the weathering characteristics of the cured product; it may be advantageous to add photo-antidegradants. A suitable combination, for instance, consists of, by weight, 2% of Irgacure 184 and 0.5% of Tinuvin 292, both trade marks of Ciba-Geigy.

Pigments and fillers are selected for different purposes. Light-transparent fillers such as silica are preferred if the penetration of UV light into deeper sections of a photo-curable material is required.

However, the filler may be chosen to be such that it participates in the cross-linking. In the case of photo-cross-linking this can be achieved by using metal salts of photo-cross-linkable acids such as the zinc salts of acrylic acid, methacrylic acid and β-carboxyethyl acrylic acid.

f) Methods

In manufacturing the unmodified polymer material the monomers are polymerized in the absence of a solvent or in the presence of a solvent which can be readily removed after polymerization, for example, toluene or xylene. If no solvent is employed, the initiator for the polymerization is dissolved in the monomer mixture, which usually requires cooling the mixture to maintain a temperature at or below 25° C. during the polymerization; or the initiator is metered into the reaction mixture during the polymerization, the level of inhibitor is also controlled and maintained.

In the absence of solvent, viscosity of the polymerization mixture increases as the polymerization proceeds resulting in the need for high torque mixing.

Suitable polymer materials which are designed to become cross-linkable after modification, especially photo-cross-linkable are based on acrylic monomers such as methylacrylate, ethylacrylate, butylacrylate and hydroxypropylacrylate and their homologues as well as the corresponding methacrylates.

As indicated the polymerization may be carried out with or without solvent. If a solvent is selected, its boiling point should be sufficiently low to facilitate its removal at the end of the polymerization, should a totally solvent-free polymer be required.

Co-monomers in the acrylate polymer can contain other functional groups. For example, the hydroxyl group may be introduced using 1- or 2-hydroxyethyl acrylate or 3-hydroxypropyl acrylate. Other suitable functional monomers are: acrylonitrile, 2(1-aziridinylethyl) methacrylate, carboxyethyl acrylate, acrylamide and caprolactone acrylate.

Initiators suitable for preparing the acrylates are peroxides and azo-type initiators.

It can be advantageous to choose an initiator which introduces a terminal functional group into the polymer, such as 3-hydroxy-1,1-dimethylbutyl peroxyneoheptanoate or 1,1-dimethyl-hydroxybutylperoxy-2-ethylhexanoate.

The polymerization can also be carried out by group transfer initiation, which permits the introduction of acrylate end groups into the polymers or the defined placement of acrylic acid groups into the polymer backbone. Such a defined placement permits a control of the subsequent polymer modification, and may improve the physical properties of the crosslinked product. The terminal acrylate groups make it possible to increase the molecular weight of the polymer during the photopolymerization by reaction with reactive acrylate diluents.

When the polymer material is produced in a solvent such as toluene or xylene, these solvents can be subsequently removed by stirring the polymer material under vacuum at 20°–150° C. until a solids level of more than 95% is obtained.

The polyfunctional reagents with which the polymer material is to be modified are mixed into the polymer material and the mixture is stirred at elevated temperatures. The reaction of glycidyl methacrylate with polymer material based on acrylate comonomers is typically carried out at 20°–140° C. over a period of up to about two hours. The treatment of polymer material based on acrylate comonomers with zinc diacrylate is typically carried out under stirring at 60°–100° C.

Preferably acrylates or substituted acrylates, for example, alkyl acrylates may be used as the polyfunctional modifying reagents depending on the desired reaction rate.

It is sometimes advantageous to add these polymer modifiers to the polymer material before other ingredients are added and carry out the chemical polymer modification thermally by heating the polymer material and its modifier at a temperature sufficient to cause a reaction of one of the functional groups on the modifying reagent without significant reaction of a second functional group. The reaction of the second functional group causes cross-linking of the polymer material. Some degree of this cross-linking may be suitable to increase the viscosity of the polymer material.

The polymer modifiers may also be added together with the other ingredients such as the reactive diluent, the cross-linking agent and photo-initiator.

The cure can be achieved on exposure to ultra-violet radiation, for example, low intensity lamps or solar radiation. Solar radiation can be sufficiently effective even behind double glazed windows, provided that the sample thickness is low or the time of exposure is sufficiently long.

The adhesive composition may be formed as a layer or coating at least 0,0625 inches thick on a flexible support substrate or carrier. Generally the layer or coating will have a thickness of 0.0625 to 0.5 inches. The layer or coating is exposed to curing radiation, especially UV radiation having wavelengths between 250 and 400 nm to cure the body of the layer as a resilient shaped body. Surfaces of the layer exposed to oxygen remain uncured and tacky.

The flexible support substrate may serve as a temporary carrier subsequently to be removed to expose a second uncured tacky surface. This second surface may be maintained uncured during its adhesion to the substrate by treatment of the substrate with an oxygen-enriched primer.

The flexible support substrate may also serve as a permanent substrate to which the adhesive layer is securely bonded, for example, a mastic rubber layer.

Instead of employing a separate discrete substrate, the adhesive composition may be blended with a mastic rubber to form a shaped layer in which the adhesive at the surface remains tacky and uncured in the presence of oxygen.

Suitable mastic rubber compositions can be based on butyl rubber, styrene-butadiene copolymers and others or mixtures thereof.

The invention is illustrated by reference to the accompanying drawings which illustrate particular embodiments, in which:

FIG. 3 is a representation of another tape product of the invention,

FIG. 9 illustrates schematically an in-line process for producing the tape of FIG. 1.

Figure 1:
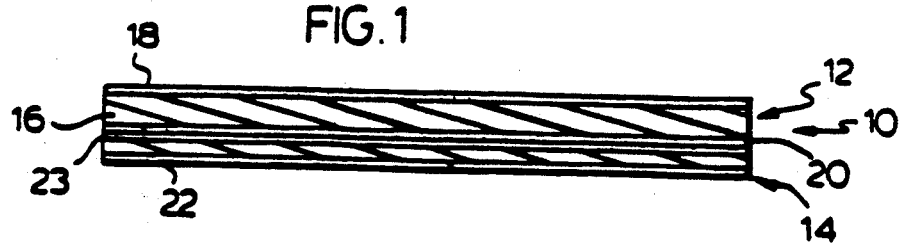
FIG. 1 is an end cross-section of a tape of the invention which may be rolled or coiled on itself for storage and transport.

With further reference to FIG. 1, a tape 10 comprises an adhesive layer 12 on a support film 14. Adhesive layer 12 has a cured body 16, a tacky outer surface portion 18 and a tacky inner surface portion 20.

Support film 14 has release coatings 22 and 23, for example, a silicone coating on its outer and inner surfaces.

Figure 2:
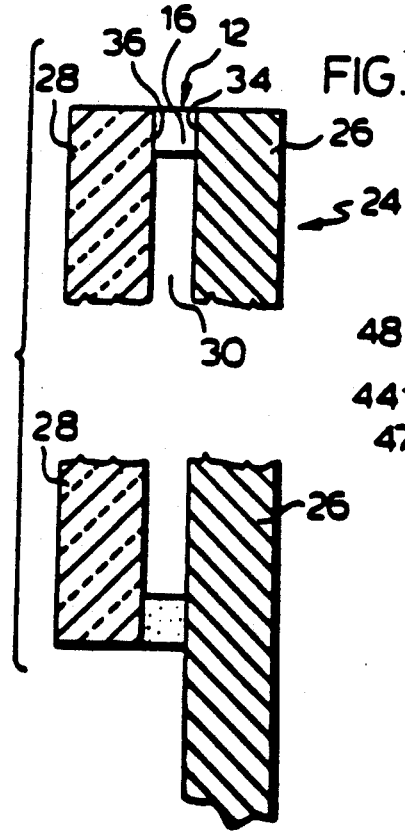
FIG. 2 is a schematic representation of an automobile window bonded with the tape of FIG. 1 to an automobile structure.

With further reference to FIG. 2, a window assembly 24 comprises a glass pane 28 mounted on an automobile structure with an air space 30 therebetween. Opposed inner surfaces of the structure 26 and pane 28 are bonded together adjacent their peripheral edges by the adhesive layer 12 derived from the tape 10 of FIG. 1. In mounting such an assembly the tacky surface portion 18 is contacted with peripheral edge of glass pane 28, to bond the tape 10 to pane 28. Thereafter, the support film 14 is removed from adhesive layer 12 to expose tacky surface portion 20, and glass pane 28 with layer 12 thereon is applied in opposed facing relationship with structure 26 and adhered by tacky surface portion 20. The release coating 23 permits ready removal of film 14 from layer 12.

The adherence of tacky surface portions 18 and 20 to the pane 28 and structure 26 respectively results in exclusion of oxygen from the surface portions 18 and 20, whereafter exposure to curing radiation, for example, U.V. radiation passing through pane 28 results in cure of the surface portions 18 and 20 to produce cured contact surfaces 34 and 36 to provide a permanent bond.

In particular, layer 12 is curable by U.V. radiation having wavelengths between 250 and 400 nm and has a thickness of 0.0625 to 0.5 inches.

Figure 4:
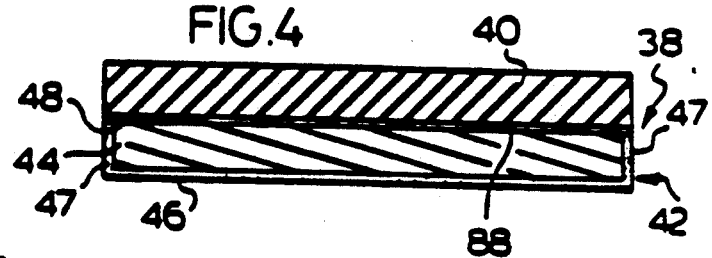
FIG. 4 is an end cross-section of the tape product of FIG. 3 of the invention.

With further reference to FIGS. 3 and 4, a tape 38 includes a rubber layer 40 and an adhesive layer 42 separated by a spacer strip 88 which may be, for example, of metal or plastic. Adhesive layer 42 includes a cured body 44, a tacky outer portion 46, tacky side portions 47 and a cured contact surface 48.

The spacer strip 88 in particular is undulating to provide flexibility to the tape 38. More especially the spacer strip may be a corrugated metal ribbon having spacer side edges. The tape 38 may be employed in bonding glass panes together in a manner analogous to those illustrated in FIGS. 6 and 7.

Figure 5:
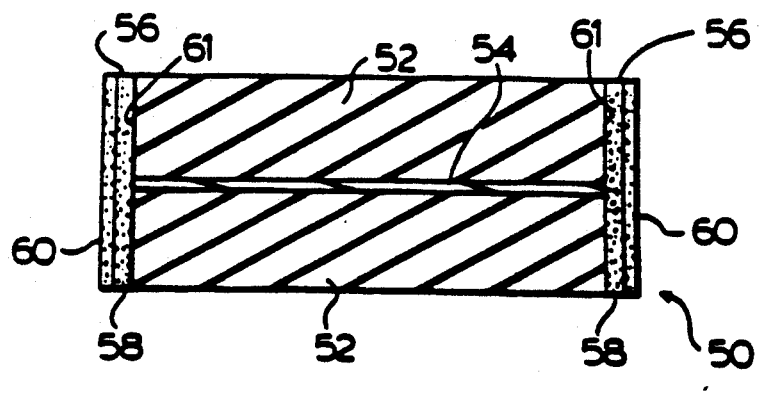
FIG. 5 is an end cross-section of still another tape product of the invention.

With further reference to FIG. 5, a tape 50 includes upper and lower rubber layers 52, a spacer 54 and adhesive layers 56. Each adhesive layer 56 includes a cured body 58, an outer tacky surface portion 60 and an inner cured contacting surface 61.

In a variant of FIG. 5, the spacer 54 may be omitted and the layers 52 then form a single layer which may consist of plastic, rubber or metal. The single plastic, rubber or metal layer 52 to which the layers 56 are adhered may contain a typical desiccant such as a molecular sieve. In the case of a metal layer 52 the desiccant would be contained in a hollow tube provided with perforations or narrow openings to allow contact between the desiccant and moisture in the air, specifically the gases between two glass panes, as in FIG. 7.

Figure 6:
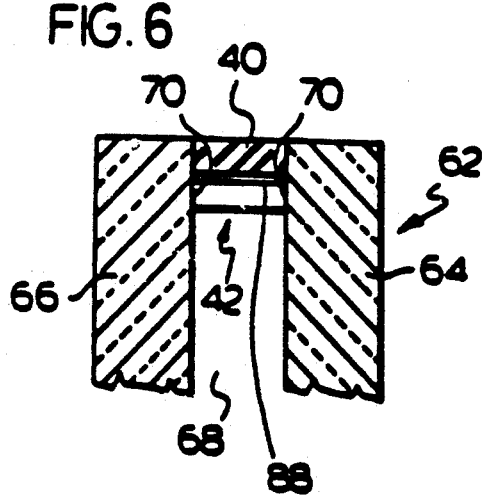
FIG. 6 is a schematic representation of a double window bonded with the tape of FIGS. 3 and 4.

With further reference to FIG. 6, a window 62 includes glass panes 64 and 66 with an air space 68 therebetween. The panes 64 and 66 are bonded together with tape 38 of FIG. 3. In particular, opposed surfaces of the panes 64 and 66 are bonded adjacent their peripheral edges by the tacky side portions 47 of adhesive layer 42. On bonding of the panes 64 and 66 by tacky side portions 47, oxygen is excluded from the side portions 47 and these portions may be cured to produce cured contact sides 70 by curing radiation, for example, ultraviolet radiation passing through glass panes 66 and 64.

Figure 7:
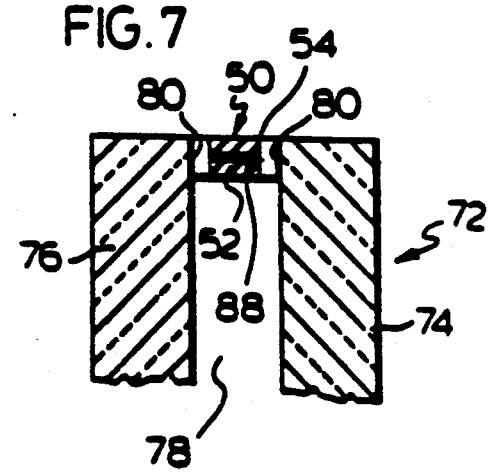
FIG. 7 is a representation similar to that of FIG. 6 employing the tape of FIG. 5.

With further reference to FIG. 7, a window 72 comprises glass panes 74 and 76 separated by an air space 78. The panes 74 and 76 are bonded together adjacent their peripheral edges by the tape 50 of FIG. 5. In particular the tacky surface portions 60 of tape 50 are employed to bond the panes 74 and 76 which results in exclusion of oxygen from the surfaces 60 whereafter they are cured to provide the cured contact surfaces 80, for example, by U.V. radiation passing through glass panes 72 and 76.

Figure 8:
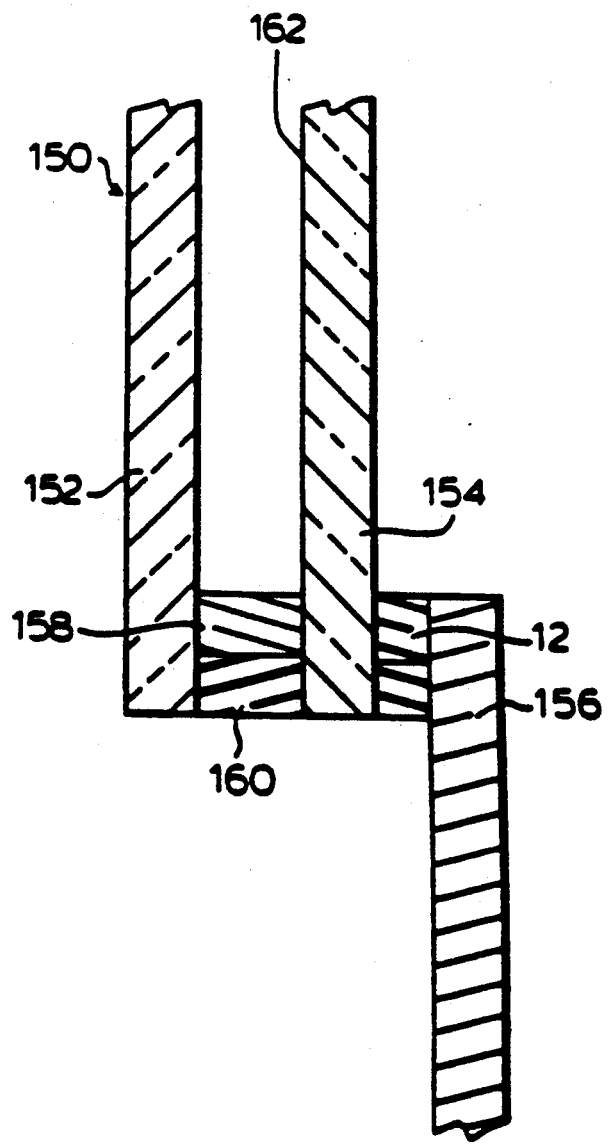
FIG. 8 is a schematic representation of a double window mounted in a frame employing the tape of FIG. 1.

With further reference to FIG. 8, a window 150 comprises glass panes 152 and 154 mounted in a frame 156. Panes 152 and 154 are separated by a spacer 158 and sealed at their peripheral edges by a sealant 160 to define an air space 162 therebetween.

Window 150 is mounted in frame 156 with adhesive layer 12 of tape 10 of FIG. 1. Tacky surfaces 18 and 20 of layer 12 are bonded to pane 154 and frame 156 respectively thereby excluding oxygen, whereafter exposure to curing radiation, for example, U.V. radiation passing through window 150 results in cure of surfaces 18 and 20 to provide a permanent bond.

With further reference to FIG. 9, there is illustrated an assembly 96 for producing the tape 10 of FIG. 1.

Assembly 96 includes a film delivery system 98, an adhesive delivery system 100, a conveyor 102, a curing system 104 and a supplementary curing system 108.

Delivery system 98 comprises rolls 110 and a bath roll 112 for delivering a continuous feed of support film 14 from a source (not shown).

Bath roll 112 is immersed in a bath 114 which suitably contains an oxygen-enriched silane-type primer which is applied to the support film 14. An oxygen line 116 provides a feed of oxygen to the primer in bath 114. The oxygen in the primer serves to inhibit the cure of the adhesive subsequently applied to the film 14.

Adhesive delivery system 100 comprises an extruder die 118 which delivers adhesive in flowable form onto support film 14 as it is conveyed by conveyor 102.

Conveyor 102 comprises a pair of belt rolls 124 and a continuous belt 126 passing about the rolls 124. Support film 14 is supported on belt 126 during application of the adhesive from extruder die 118, whereby an adhesive layer 12 is formed on film 14.

Curing system 104 includes upper and lower banks 120 and 122 of UV lights which direct UV radiation to adhesive layer 12. A continuous belt 126 conveniently has an open surface or is in any event transparent to UV radiation so that such radiation from lower bank 122 may reach adhesive layer 112. For this purpose it is also appropriate that support film 14 be transparent to UV radiation.

Conveniently upper and lower banks 120, 122 are relatively long in length, particularly of the order of 10 meters and comprise low or medium intensity lamps. In this event it is appropriate to employ a supplementary curing system 108 which comprises high intensity upper and lower lamps 128 and 130 with upper and lower lenses 132 and 134 to direct the high intensity radiation.

Spray 136 is optional and applies a primer spray to the finished paper 10 before it is rolled on itself to form the roll 138.

Figure 10A:
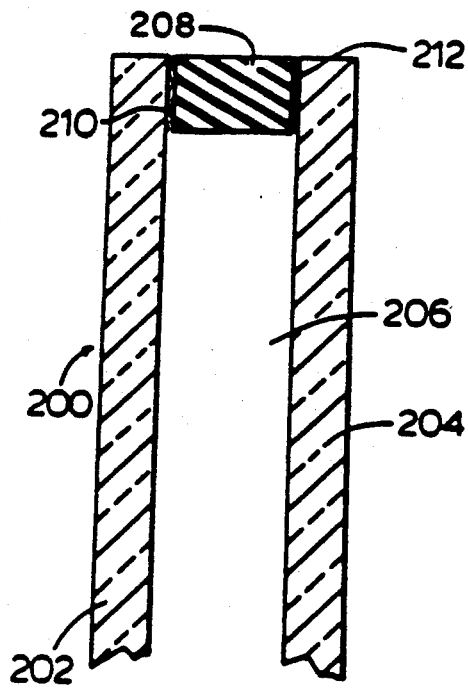
FIGS. 10A, 10B and 10C, illustrate schematically double windows adhesively bonded with different command cure formulations of the invention.

With further reference to FIG. 10A, a window assembly 200 comprises spaced apart windows 202 and 204 with an insulating air space 206 therebetween. The windows 202 and 204 are spaced apart by a spacer 208 which may comprise elongated aluminum members of rectangular cross-section. Spacer 208 is bonded to and between the opposed surfaces of windows 202 and 204 by adhesive sealants 210 and 212 initially formed as coatings on opposed sides of spacer 208. The sealants 210 and 212 are derived from capped urethane-forming compositions. After assembling the windows 202 and 204 with the spacer 208 therebetween, coated with the sealants, the assembly 200 is heated to uncap the isocyanates of the composition which thereafter cure t form the sealants 210 and 212.

Figure 10B:
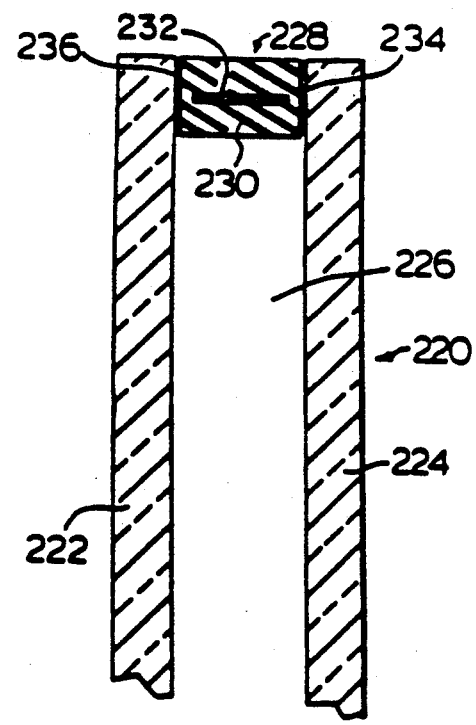

With further reference to FIG. 10B, a window assembly 220 comprises spaced apart windows 222 and 224 with an insulating air space 226 therebetween. The windows 222 and 224 are separated by a tape 228. Tape 228 comprises a rubber strip 230 with a corrugated spacer strip 232 extending between opposed sides. Neoprene layers 234 are bonded to the opposed sides of the rubber strip 230.

After assembling the windows 222 and 224 with tape 228 therebetween, the assembly is heated to melt the surfaces of the neoprene layers 234 contacting the window surfaces, thereafter the neoprene layers 234 cool to provide a firm adhesive bond.

Figure 10C:
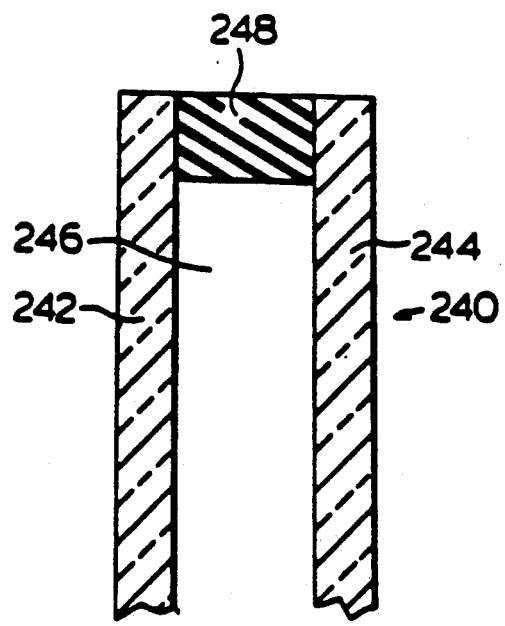

With further referece to FIG. 10C, a window assembly 240 comprises spaced apart windows 242 and 244 with an insulating space 246 therebetween. The windows 242 and 244 are spaced apart by an extruded neoprene tape 248. The adhesive bond between the tape 248 and the windows 242 and 244 is produced in the same manner as described for the neoprene layers 234 in FIG. 10B.

The following Examples illustrate the invention in particular and preferred embodiments.

EXAMPLES

A) Materials

The following starting materials were used for the production of the reactive ingredients:

Polyether Diol was grade POLY-G2 TM of Olin Chemical Company, U.S.A. It has an average molecular weight of 775.

Polyether polyol was grade PLURACOL TM 220 obtained from Wyandotte Chemical, U.S.A.

Aerosil TM was grade 130 from Degussa, Germany. It has an average primary particle size of 16 nanometers.

Isodecylacrylate was obtained from Sartomer Company, U.S.A.

Zinc di- and mono-acrylates were obtained from Sartomer Company, U.S.A. The materials are powders which pass through a 325 mech.

Glycidyl Methacrylate was obtained from Sartomer Company, U.S.A. 2-(1-Aziridinyl) ethylmethacrylate was obtained from Aceto Chemical Company, Inc., U.S.A. The material has a purity of >92% by gas-liquid chromatography.

B) Preparation of Reactive Ingredients

Poly (Alkylene Oxide) Diacrylate

This material was prepared by treating a poly(propylene oxide) diol with toluene diisocyanate and subsequent reaction with hydroxypropyl acrylate.

To 537 g of poly(propylene oxide)diol of average molecular weight of 775, was added 109 g of toluene, 0.1 g of benzoyl chloride and 250 g of toluene diisocyanate. The solution was heated at 95°–100° C. for a period of 3.5 hr. Then was added 191.2 g of hydroxypropyl acrylate and the temperature was kept at 95°–100° C. for another 2.5 hr. Finally, 0.114 cc. of stannous octoate was added and heating continued for another 1 hr.

Poly (Alkylene Oxide) Triacrylate

This material was prepared by treating poly (propylene oxide) triol with methylene-bis-cyclohexylisocyanate and subsequent reaction with hydroxypropyl acrylate.

To 1570 g of poly(propylene oxide)triol (Wyandotte Pluracol 220 TM) of a hydroxy number of 26.88, was added 0.5 ml of a 10% solution of tin dibutyllaurate in xylene at 70° C. Then 211 g of methylene-bis-cyclohexylisocyanate was added and the temperature increased to 95° C. and kept there for approximately 3 hr. Then another quantity of catalyst was added (0.5 ml) and 104.7 g of hydroxypropyl acrylate. The solution was then heated for 4 hr. at 95° C. Then a third quantity of catalyst was added (0.3 ml), and after 2 hr. of heating, the solution was allowed to cool down. The product had a residual isocyanate content 9 of 0.3%.

C) Acrylate Polymer Production

EXAMPLE 1

Poly(butylacrylate-acrylic acid)

1a) A monomer solution of 588 g butylacrylate, 130 g of acrylic acid, 1.5 g of laurylmercaptan and 1.0 g of γ-methacryloxypropyl trimethoxysilane in 50 ml of xylene and a catalyst solution of 20 g of lauryl-peroxide and 4 g of t-butylperoxide in 50 ml of xylene were prepared. The polymerization was started with 50 ml of the monomer solution and 2 ml of the catalyst solution by adding to a resin kettle with stirring, with a nitrogen atmosphere and heating to 54° C. After the induction period was over, the remaining solutions were added in equivalent proportions over 3 hrs. at a reaction temperature of 120°–135° C. The resulting clear polymer was heated for another 3 hours at 100° C. On cooling, a tough rubbery material, poly(butylacrylateacrylic acid (84:16) was obtained.

1b) A polymer material was prepared in the manner of Example 1a) employing from 80 g butylacrylate, 40 g acrylic acid and 0.2 g of laurylmercaptan in 10 ml of xylene as the monomer solution and 2 g of laurylperoxide and 0.4 g of t-butylperbenzoate in 10 ml. of xylene as the catalyst solution. The reaction conditions were as for Example 1a). The polymer material is a thermoplastic material poly(butylacrylate-acrylic acid (60:40).

EXAMPLE 2

Poly(ethylacrylate-acrylic acid-acrylonitrile)

a) this polymer material was produced by adding to 320 g xylene at 100° C. the monomer solution and a catalyst solution over a period of 3 hours. The monomer solution contained 2.900 g ethyl acrylate, 76 g acrylonitrile, 76 g acrylic acid and 3 g laurylmercaptan. The catalyst solution contained 26 g laurylperoxide and 7 g butylperbenzoate in 273 g of xylene. The material was highly viscous with comonomer proportions of 95:2.5:2.5.

EXAMPLE 3

Poly(butylacrylate-ethylacrylate-acrylonitrile

This polymer material was produced in the manner of Example 2, except that 1.450 g of the ethylacrylate was replaced with 1.450 g of butyl acrylate, to produce a polymer of equivalent butyl acrylate and ethylacrylate proportions. Also, the monomer solution contained 1.5 g of γ-methacryloxypropyl trimethoxysilane. The material was highly viscous with comonomer proportions of 47.5:47.5:2.5:2.5.

EXAMPLE 4

Poly(butylacrylate-ethylacrylate-acrylic acid)

Into a reaction vessel was added a solution of 72.6 g of ethylacrylate, 93 g of butylacrylate, 3.8 g of acrylic acid, 5 g of azo-bis-isobutylronitrile and 0.68 g of lauryl mercapan. Initially, 10 g were added and the solution was heated up until the induction period has passed. The main portion was then added at a rate so that the internal temperature remained between 125°–130° C. The addition was carried out over a period of one hour, after which time the polymer material could be stirred easily. The polymer material remains a clear but viscous liquid at 25° C., with comonomer proportions of 54.5:43.1:2.4.

EXAMPLE 5

Poly(butylacrylate-ethylacrylate-acrylic acid

Polymerization was initiated with a solution of 21.7 g of ethyl acrylate, 50 g of butyl acrylate, 3 g of acrylic acid, 2 g of azo-bis-isobutyronitrile and 0.2 g of lauryl mercaptan in a reactor by slow heating, starting at 25° C. The polymerization started vigorously at 55° C. The main part of the polymerization was carried out between 100° and 120° C. by a slow addition of 250 g of the same monomer mixture over a period of two hours with external waterbath cooling. Since stirring becomes difficult at this stage, the material was removed from the reactor and heated for two additional hours at 120°

C. The polymer material was highly viscous with co-monomer proportions of 67:28:5.

EXAMPLE 6

Poly(butylacrylate-ethylacrylate-acrylic acid

A starting solution of 45 g of ethylacrylate, 45 g of butylacrylate, 5 g of acrylic acid, 0.5 g of azo-bis-isobutyronitrile and 0.35 g of lauryl mercaptan was added in 5 portions to a stirred reaction kettle at a kettle temperature of 70° C. Each portion was only added after an exotherm had indicated that the previous portion had reacted. The reaction was continued over a period of three hours at a temperature between 80° and 105° C. with a solution of 442 g of ethylacrylate, 442 g of butylacrylate, 44 g of acrylic acid, 50 g of azo-bis-isobutyronitrile and 6.1 g of lauryl mercaptan. Because of the high viscosity of the product, stirring in the reaction vessel becomes difficult. The polymer material was removed from the reactor and heated without stirring for 2 hours at 120° C. The polymer material was rubbery with comonomer proportions of 47.6:47.6:4.8.

EXAMPLE 7

Poly(butylacrylate-ethylacrylate-acrylic acid)

To 1713 g of a monomer mixture consisting of 54.3% of butylacrylate, 42.3% of ethylacrylate and 3.4% of acrylic acid was added 40 g (2.5%) of azo-bis-isobutyronitrile and 6.8 g (0.4%) of lauryl mercaptane at 22° C. The solution was cooled to 10° C. and added dropwise to a stirred and heated reaction vessel with a wall temperature of approximately 70° C. The reaction started immediately. The addition was continued and the reaction vessel cooled at such a rate that the internal temperature remained between 105° and 135° C. Near the end of the addition, the stirring of the polymer becomes very difficult with a single-blade stirrer because of a strong Weissenberg effect. The addition was complete after 3 hours. The polymer was then heated for another 3 hours at 80°-100° C. The resulting polymer was a highly viscous material with comonomer proportions of 54:3:42:3:3.4.

EXAMPLE 8

A solution was prepared consisting of 865 g butylacrylate, 535 g ethylacrylate, 38 g acrylonitrile, 76 g of β-carboxyethylacrylate and 1.5 g dodecylmercaptan.

A second solution was prepared containing 3.5 g t-butyl peroxide, 13.5 g laurylperoxide and 137 ml mineral spirits. A stirred resin kettle contained 160 ml of mineral spirits and was heated to 100° C. The monomer and initator solutions were added dropwise at equivalent proportions over a period of 3 hours at a reaction temperature of 95°-125° C. with constant stirring, and some cooling in a water bath. The polymer was allowed to cool down.

GLC analysis shows the following residual monomer concentration:

Butylacrylate=0, ethylacrylate=0.5%, acrylonitrile=0.03%, β-carboxyethylacrylate-0.1%.

EXAMPLE 9

A solution of 1700 g butylacrylate, 240 g ethylacrylate, 60 g acrylic acid and 4 g dodecylmercaptan was added dropwise to a pre-heated reactor (~100° C. wall temperature). The reactor was stirred with a single-shaft glass stirrer equipped with a Teflon TM blade. At the same time was added 80 g of Lupersol TM 531-80M, dropwise at a rate that both monomer and peroxide were always added in the same proportions over the total addition period of 3.5 hours. After the initial addition of approximately 25 ml the reactor vessel was cooled so that the reaction temperature remained between 95° and 110° C. After 200 ml of monomer addition, 30 ml of toluene was added to improve stirring. Another 30 ml were added after a total of 450 ml monomer, and another 70 ml after 600 ml of monomers. The clear polymer was heated at 70° C. for six hours.

EXAMPLE 10

A four-necked flask, equipped with thermometer, heavy-duty single-shaft glass stirrer containing a Teflon TM blade, thermometer, dropping funnels for monomers and initiator solution, and containing 50 g of toluene was heated to cause refluxing of the toluene. The monomer mixture consisted of 1700 g butylacrylate, 240 g ethylacrylate, 60 g acrylic acid and 6 g of dodecylmercaptan. The initiator solution contained 54 g of lauryl peroxide and 14 g t-butylperbenzoate in 150 ml toluene. Over a period of 3 hours the two solutions were added at the equivalent rate into the reactor vessel under stirring and cooling to maintain the reaction between 85° and 110° C. The polymer could easily be stirred. It was heated over night at 70° C. and then had a viscosity of 23,600 cps at 70° C. (Brookfield, Spindle #3). After 4 hours at 200° F. under vacuum in the Baker/Perkin mixer the solids level was 99.5%. The viscosity at 29° C. was $2.5 \times 10^6$ cps and at 70° C. $0.12 \times 10^6$ cps.

D. Adhesive Compositions

EXAMPLE 11

Surface Treatment of a Compounded Rubber with a Photo-Curable Formulation

A coating of the photo-curable formulation A, in Table I below, of about 0.5 mm thickness was applied to both sides of a strip of compounded rubber. The rubber formulation consisted of 16% butyl rubber, 26% hydrocarbon resins, 21% plasticizer and 37% carbon black and inorganic fillers. The strip was placed between glass plates and both sides of the glass were exposed to low-intensity ultra-violet light of an intensity of 1200 μW/cm². The use of the photo-curable formulation prevented adhesive failure when the glass plates were removed under force or on impact at −34° C.

EXAMPLE 12

Preparation of a Photo-Cured Adhesive Material in Low-Intensity Ultra-Violet Light A 0.3 mm thick layer of the photo-curable formulation A, in Table I below, was cast on a sheet of silicone-treated release paper and exposed to low intensity ultra-violet light of an intensity of 1200 μW/cm². After 30 min. exposure the material was cured but both the upper and lower surfaces remained tacky. The material had a SHORE A hardness of 40, an elongation at break of 150%, a tear strength of 7.7 lb/in, and a tensile strength of 42 lb/in. The sample remained flexible at −42° C. and showed good adhesion to glass after attaching glass plates to the upper and lower surface of the material and exposing the system to sun light for 60 minutes at 25° C.

EXAMPLE 13

Preparation of Photo-Cured Adhesive Material in High-Intensity Ultra-Violet Light The photo-curable formulation B, in Table I below, was extruded in strips of 1.5 cm width and 3 mm thickness onto silicone-treated release paper. The strips were passed under a medium-pressure Hanovia TM 652-OA 431 UV lamp of an intensity of 200 W/square inch at a speed of 27 feet per minute. This corresponded to an exposure time of the focussed light beam of 0.5 seconds. The cured strip can be transferred to glass or other solid surfaces so that it is attached to one or two such surfaces. After exposing the system to low-intensity UV light sources, including sun light, the material bonds to the glass interface.

The material remained flexible and tacky at −32° C., but became brittle at −35° C. The material showed cohesive failure on anodized aluminum at −36° C. in a peel test.

EXAMPLE 14

The polymer of formulation C, in Table I below, was prepared by mechanically stirring 23.7% of zinc diacrylate into 475 g of the polymer of Example 7 and then heating at 70° C. for 5 hours with occasional mixing and deaeration after 5 hours and 30 minutes.

The resulting polymer had very low tack, was not gelled, but was opaque.

To the polymer was then added 42.7 g poly(alkylene oxide) triacrylate (9 pph) described above and 2.4 g (0.5 pph) Irgacure TM 184. The material was mixed at 70° C. and then deaerated which caused considerable frothing. The material had very little tack, was not gelled, had little flow, and adhered sufficiently to release paper.

Tests show that excellent adhesion to glass developed on exposure of the material to "Black Light".

EXAMPLE 15

Preparation of Photo-Cured Adhesive Material in High-Intensity Ultra-Violet Light for Adhesion to Glass and Metals.

The photo-curable material of formulation C, in Table I below, was cast into a sheet of 2 mm thickness onto release paper. The sheet was cured by six passes underneath a HANOVIA TM light source of an intensity of 200 W/square inch at a speed of 27 feet/min. This corresponds to an exposure time of 3 seconds to the focussed light beam. The material showed a SHORE A hardness of 35 and an elongation of 150%. The cured material has sufficient tack on both the upper and the lower surface to adhere very well to solid surface. The material was cut into 1 cm wide strips and placed between the following surfaces:
glass and milled aluminum
glass and anodized aluminum
glass and glass.

After exposing the glass side to sun light for one hour behind double-glazed windows, excellent adhesion was obtained to all the interfaces, as evidenced by the cohesive failures when the glass or metal surfaces were removed.

A sheet 8″ wide and 3/16″ thick and 12″ long was allowed to flow slowly into release paper at 40° C. and is then exposed to a Hanovia TM lamp of a focus width of 1″, at a travelling speed of 4 feet per minute. The cured sheet was approximately 35° C. warm and could easily be removed from the release paper on cooling to 25° C.

The polymer had the following properties:

|  | Initial Polymer | After "Black Light" Exposure |
| --- | --- | --- |
| Dumbell |  |  |
| Elongation | 350, 500% | 300% |
| Tear Strength | 16.7; 16.0 pli | 55, 50 pli |
| Tensile Strength | 132, 126 psi | 175, 180 psi |
| Colour | Colourless | Pale Yellow |
| Hardness | 35-40 | 35-40 |
| Flexibility at −32° C. | Partially | Partially |

|  | Initial Polymer | After Black Light Exposure |
| --- | --- | --- |
| Elongation | 350, 500% | 125% |
| Adhesion |  | 97 psi |
| Lap Shear |  |  |
| Glass/Glass | 26 psi* | 131 psi |
| Glass/Anodized Aluminum | 36 psi* | 126 psi |

NOTE:
*Adhesive failure; surface remains tacky and and can be re-adhered.

EXAMPLE 16

Preparation of Photo-Cured Adhesive Material in High Intensity Ultra-Violet Light for Adhesion to Glass and Metals.

The photo-curable material of formulation C in Table 1 was cast at about 60° C. into a H-bead in accordance with ASTM C 719-79 and photo cured by exposure to sunlight and tested for elongation and adhesion.

The photocured material displayed the same properties as in Example 19.

EXAMPLE 17

To the polymer of Example 3 was added 2.1% zinc diacrylate at 120° C. with stirring and subsequent heating at 120° C. for 30 minutes. Vacuum was applied to deaerate the material. Then 15% of poly(alkyleneoxide)triacrylate and 0.25% of Irgacure TM 184 was added with stirring at 80° C.

The material was then spread on release paper to a thickness of 4 mm. The material had very little flow at amnient temperature, adhered very well to milled aluminum and glass, and could be removed from release paper and cut.

The material was then exposed to a Hanovia TM lamp of a focus width of 1″ at a travelling speed of 4 feet per minute.

EXAMPLE 18

To the poly(butylacrylate-ethylacrylateacrylonitrile) of Example 3 was added 2.1% zinc diacrylate at 120° C. with stirring and subsequent heating at 120° C. for 30 minutes. Vacuum was applied to deaerate the material. Then 15% of PAO-TA and 0.25% of Irgacure 184 were added with stirring at 80° C.

The material was then spread on release paper to a thickness of 4 mm. The material had very little flow at ambient temperature, adhered very well to milled aluminum and glass, and could be removed from release paper and cut.

The material was then exposed to a Hanovia TM lamp of a focus width of 1″ at a travelling speed of 4 feet per minute.

The material showed a lap shear strength of 86 p.s.i. between glass plates after the glass plates had been exposed to sunlight for three days.

Lap shear specimen were exposed to 1000 hour Q-UV exposure at 60° C. (8 hours UV light and 4 hours condensation cycle) and then showed an average lap shear value of 59 psi.

EXAMPLE 19

Photo-Curing and Physical Properties of Polymer of Example 3

A sample of formulation D, in Table I below, was spread out on silicone treated paper (release paper) to a thickness of ⅛ of an inch and photo-cured under Black Light for 3 to 15 minutes, respectively.

The test materials showed elongation at failure values of 500%. The lap shear values between glass were in the range of 71–75 p.s.i. after exposure to sunlight for 3 days.

A sample of formulation D, in Table I below, was spread out on silicone treated paper (release paper) to a thickness of ⅛ of an inch and photo-cured under a Hanovia TM UV lamp and then placed between glass, exposed to sunlight for 3 days. The resulting lap shear strength was 45 to 51 p.s.i., respectively.

EXAMPLE 20

Photo-Curing and Physical Properties of Polymer of Example 10

Formulation E, in Table I below, was prepared by mixing the polymer with zinc monomethacrylate and heating at 70° C. for 2 hours. The other ingredients were mixed under high shear mixing (Haake-Buchler Torque Rheometer) and then extruded in sheets of 3/16 inch thickness and exposed to Black Light of 120 $\mu W/cm^2$ intensity for 3 minutes. The material then showed 200% elongation at failure. Samples placed between glass and exposed to sun for 3 days developed lap shear strength of 97 p.s.i.

EXAMPLE 21

When the zinc monomethacrylate in Example 21 was replaced with zinc dimethacrylate, the precured polymer also showed an elongation of failure of 200% and, after exposure of a glass lap shear specimen to sun for 3 days, a lap shear value of 86 p.s.i.

EXAMPLE 20

Photo-Curing and Physical Properties of Polymer of Example 10

Formulation E, in Table I below, was prepared by mixing the polymer with zinc monomethacrylate and heating at 70° C. for 2 hours. The other ingredients were mixed under high shear mixing (Haake-Buchler Torque Rheometer) and then extruded in sheets of 3/16 inch thickness and exposed to Black Light of 120 $\mu W/cm^2$ intensity for 3 minutes. The material then showed 200% elongation at failure. Samples placed between glass and exposed to sun for 3 days developed lap shear strength of 97 p.s.i.

EXAMPLE 21

When the zinc monomethyacrylate in Example 21 was replaced with zinc dimethacrylate, the precured polymer also showed an elongation of failure of 200% and, after exposure of a glass lap shear specimen to sun for 3 days, a lap shear value of 86 p.s.i.

TABLE I

|  | A | B | C | D | E |
|---|---|---|---|---|---|
| Polymer (Ex. 3) | 100 | — | — | — | — |
| Polymer (Ex. 7) | — | 100 | 100 | — | — |
| Polymer (Ex. 9) | — | — | — | 100 | — |
| Polymer (Ex. 10) | — | — | — | — | 100 |
| ZDA | 5 | 5 | 5 | 5 | — |
| ZMA | — | — | — | — | 5 |
| IDA | 20 | 7.9 | — | — | — |
| PAO-TA | 41 | 20.6 | 9 | 10 | 10 |
| PAO-DA | — | 20.6 | — | — | — |
| AAD | 5 | 8.4 | — | — | — |
| Irgacure-184 TM | 0.5 | 0.5 | 0.5 | 0.5 | 0.5 |

ZDA = zinc diacrylate
ZMA = zinc monomethacrylate
IDA = isodecylacrylate
PAO-TA = poly(alkylene oxide) triacrylate
PAO-DA = poly(alkylene oxide)diacrylate
AAD = β-carboxyethylacrylate (i.e., acrylic acid dimer)

Photo-initiated cross-linking of adhesive formulations is restricted to materials which are optically clear. However, formulations which contain inorganic fillers, and are thus less expensive, can be cross-linked by thermal initiation, for example, such as direct heat or microwaves. Acrylate formulations have been developed, which can be cured thermally and remain tacky so that the partially cured material can be used as adhesive tape and sheet. The surface tackiness is due to air inhibition of the acrylate polymerization.

EXAMPLE 22

Thermal Cure

A polymer was prepared from 85 parts butyl acrylate, 12 parts ethyl acrylate and 3 parts acrylic acid in 6 parts toluene. The initiator was Lupersol 531-80M (trade mark of Pennwalt/Lucidol Corp., U.S.A.), (4 parts) and the chain transfer agent was dodecylmercaptan (0.2 parts), (Polymer of Example 9).

The solvent was removed from the formulation and the viscous material was treated with 5 parts zinc diacrylate, followed by the addition of 10 parts of a triacrylate, prepared from a polyether polyol (Pluracol 200, trade mark of Wyandotte, U.S.A.), methylene-bis-cyclohexylisocyanate and hydroxylpropyl acrylate. Furthermore, 0.5 parts of an initiator Irgacure 184 (trademark of Ciba-Geigy), was added.

The material was sheeted out and heated at 112° C. for 15 minutes, after which the material still showed some flow at 25° C., but remained tacky.

A lap shear speciment between glass after 2 hours exposure to sun showed a value of 99 p.s.i. When the thermal cure was extended to 30, 45 and 60 min. respectively, the lap shear values after exposure to sun were 84, 118 and 48 p.s.i., respectively.

EXAMPLE 23

Microwave Cure

A sample of the formulation of Example 22 was sheeted out to a 4"×4"×⅛" sheet and exposed for 1 min. to full power in a conventional home microwave oven. The sample had heated up and cured, maintaining tacky surfaces at room temperature. A lap shear test between glass, after exposing one of the glass/polymer interfaces to sun for 3 hours showed a lap shear strength of 41 p.s.i.

EXAMPLE 24

Plastisol Command Cure

| Ingredients | Parts by Weight |
|---|---|
| Vinyl Resin, Geon 121 | 100 |
| Plasticizer, Di-Octyl Phthalate | 85 |
| Calcium carbonate, Atomite | 100 |
| Carbon Black N650 | 1 |
| Silane Prosil 221 | 1.5 |

Geon 121 - trade mark of The B. F. Goodrich Company.
Atomite - trade mark of Thompson-Weiman Co.
N650 - Columbian Chemical Co.
Prosil 221 - trade mark of SCM Corp.

A plastisol was formed by mixing the vinyl resin and di-octyl phthalate plasticizer for 15 minutes at medium speed in a caulk mixer to form a dispersion.

The calcium carbonate reinforcement pigment was added followed by mixing for a further 10 minutes at medium speed, whereafter the carbon black was mixed in until dispersed.

The silane for promoting adhesive properties was added with mixing for five minutes.

The resulting plastisol composition was applied as a sealant between two lites of glass and the resulting assembly was heated to 325° F. for 15 minutes. The plastisol composition formed an elastomeric rubber-like bonding sealant between the lites.

EXAMPLE 25

Photo-Curable Sealant/Adhesives

A commercially available U.V. adhesive was applied to cured EPDM and spacer strips as manufactured by Tremco. The adhesive used was "light-weld 625" manufactured by American Chemical and Engineering Co.

The coating was permitted to dry at ambient conditions for 24 hours. An insulating glass assembly was then made with the coated spacer inserted between two pieces of 3/16 inch glass. A cure was then obtained by exposing the bond line to ultra violet light as generated by a General Electric RS-1 lamp.

A firm sealing bond was produced in a period of seconds.

EXAMPLE 26

Anaerobic Command Cure

A commercially available anaerobic adhesive was applied to cured EPDM and neoprene spacer strips as manufactured by Tremco. The adhesive used was "Speed Bonder Structural Adhesive" manufactured by Loctite Corporation.

An insulating glass assembly was formed of two lites of glass with the coated spacer bar therebetween. The glass lites were pressed together to exclude oxygen whereby the adhesive was curved to form a firm sealing bond between the glass lites.

EXAMPLE 27

Butyl-Chlorobutyl Command Cure

| Ingredients | Parts by Weight |
|---|---|
| Chlorobutyl, HT 1066 | 500 |
| Carbon Black, Statex R | 250 |
| Phenolic Resin SP 1055 | 25 |
| Polybutene, H-300 | 500 |
| ZnO powder | 15 |
| Silane, Prosil 221 | 12.5 |

HT1066 - Exxon Corp.
Statex ™ R - Columbian Chemical Corp.
SP 1055 - Schenectady Chemicals, Inc.
H-300 - Amoco Corp.
ZnO (Zinc Oxide) - Whittaker, Clark and Daniels Co.
Prosil ™ 21 - SCM Corp.

The chlorobutyl rubber, carbon black and phenol resin were mixed for 30 minutes in a Sigma mixer to a temperature of 180° F. The polybutene and zinc oxide powder were added to the mixture and the mixing continued for 15 minutes bringing the mixture to a temperature of 160° F. The silane was added and the mixing was continued for 5 minutes.

The resulting material was cooled to room temperature and then extruded into a pre-formed tape having a cross-sectional dimension of ¼ inch by 3/16 inch.

An insulated glass assembly was then made inserting the tape between two pieces of 3/16 inch glass with the 3/16 inch sides in contact with the glass.

The assembly was then baked at 275° F. for 20 minutes to effect a cure.

The glass assembly was held firmly together by the tape.

EXAMPLE 28

Blocked Urethane Command Cure

| Ingredients | Parts by Weight |
|---|---|
| Blocked Poly BD (toluene diisocyanate blocked with nonyl-phenol) | 15 |
| Plasticizer, Santocizer* 261 | 7.5 |
| Ca CO₃, Atomite | 15 |
| Carbon Black, Statex* R | 1.5 |
| Accelerator, Quadrol* | 1 |
| Dibutyl-tin-dilaurate (DBTDL) | 0.15 |
| Accelerator DMP-30 | 0.15 |
| Silane, A187 | 0.3 |

Poly BD R-45 - Acro Chemical
Santocizer* 261 - Monsanto Chemical
Atomite* - Thompson-Weiman Co.
Statex* R - Columbian Chemical Co.
Quadrol* - Wyandotte
DBTDL - Cosan Chemical Co.
DMP-30 - Rohm & Haas
A187 - Dow Corning
*trade mark The toluene diisocyanate blocked with nonylphenol was mixed with the plasticizer for ten minutes in a caulking mixer; the calcium carbonate and carbon black were added and mixing was continued for 30 minutes to form a smooth blend. The two accelerators and the dibutyl-tin-dilaurate (DBTDL) were added and mixing continued for 10 minutes, whereafter the silane was added with mixing for a further 5 minutes.

The resulting blend was pumped into the space defined by two lites of glass and a conventional aluminum spacer bar. The resulting assembly was baked at 290° F. for 20 minutes during which time the heat sensitive phenol is split off from the toluene-diisocyanate allowing the latter to cure to a urethane polymer firmly bonding and sealing the assembly.

The blocked toluene diisocyanate was formed as follows:

| | |
|---|---|
| Poly DB R-45HT | Equiv. Wt. = 1203.9 |
| Nonyl Phenol | Equiv. Wt. = 220 |
| TDI | Equiv. Wt. = 87 |

| Reagent | Amount |
|---|---|
| R-45HT | 301 gms. |
| TDI | 45.7 gm (5% excess) |
| NP | 60 gms (55 + 5 to absorb excess TDI) |
| Benzoyl chloride | 0.3 gms (0.1%) |

Procedure

1. Add R-45HT and benzoyl chloride to a reactor and stir together under $N_2$ at room temperature for 30 minutes.
2. Add TDI and continue stirring under $N_2$ without heating (An exotherm was observed to increase the temperature to 37° C. from 25° C.).
3. After reacting for 2½ hrs., % NCO was 3.5141% which corresponds to conversion of 93.9% of the polyol. (44.7% of NCO consumed).
4. The reaction was run another 30 minutes and then the nonyl phenol was added. An exotherm to 34° C. was observed.
5. After sitting overnight % NCO was 2.7086% = 50% consumed.
6. Heating to 90° C. for 2 hours (including heat-up time) gave % NCO = 2.5410% = 53.1% NCO consumed.
7. The reaction mix was allowed to cool to 50° C. and 5 drops of stannous octoate were added. The reaction mix was allowed to cool to ambient temperature after stirring in the catalyst, and the reactor stoppered.
8. The % NCO was determined as % NCO = 1.6285% = 70%.
9. 5 more drops of stannoud octoate were added and the mixture was heated to 90° C. until % NCO = 0.58205% = 89.3% con.
10. After sitting overnight at room temperature, the reaction mix· was heated to 90° C. (% NCO = 0.25584% = 95.3% consumed). Then 5 more drops of stannous octoate were added. Heating was continued for 90 minutes NCO % = 0.17880% = 96.7% consumed.
11. The polymer was transferred hot, 370 gms eq. wt. (calculated) = 1478 gms viscosity = 3,400 Kcps.

EXAMPLE 29

Epoxy Command Cure

| Ingredients | Parts by Weight |
|---|---|
| Epoxy Resin, EPON TM 828 | 100 |
| Dicyandiamide Powder | 10 |
| CaCO₃ (Atomite TM) | |

EPON TM 828 - Shell Chemical Corp.
Dicyandiamide - American Cyanamide Corp.
Atomite TM - Thompson-Weinman Co.

The epoxy resin and dicyandiamide powder were mixed for 10 minutes in a caulk mixer to form a dispersion. The calcium carbonate was added and mixing continued for 15 minutes until the carbonate was dispersed. The resulting sealant composition was shelf stable and was pumped into the space defined by two lites of glass and an aluminum spacer bar. The assembly was heated at 350° F. for 15 minutes to effect cure of the sealant to firmly seal and bond the assembly.

EXAMPLE 30

Neoprene Command Cure

| Ingredients | Parts by Weight |
|---|---|
| Neoprene, AC-S | 600 |
| Chlorobutyl, HT 1066 | 100 |
| Magnesium Oxide Maglite TM D | 30 |
| Anti-oxidant, 2246 | 18 |
| Stearic Acid | 30 |
| Phenolic Resin, Super Beckacite TM | 426 |
| Clay, Dixie | 561 |
| Carbon Black Statex TM R | 30 |
| Plasticizer Santocizer TM 268 | 168 |
| Molecular Sieve Powder, 4A | 66 |
| Molecular Sieve Powder, 10A | 66 |
| Silane, A-1120 | |

The neoprene, chlorobutyl and magnesium oxide were mixed for 15 minutes in a Sigma blade mixer until the ingredients were broken down and knitted together. The antioxidant and stearic acid were added and mixed in until dispersed. The phenolic resin was added and mixing continued to form a smooth blend, whereafter the clay and carbon black were added slowly with mixing so as not to break the knit and to form a smooth blend. The plasticizer and the molecular sieves were mixed in until dispersed while maintaining the temperature below 250° F. and finally the silane was added followed by mixing for 5 minutes.

The bulk composition was cooled to ambient temperature and extruded to a pre-formed tape with a cross-sectional dimension of 3/16 inch by ¼ inch. The tape was used as a spacer between two lites of glass and the resulting glass assembly was passed through an infrared oven in which it was heated to a temperature of 165° F. The assembly was passed between a series of compression rollers to firmly press the tape into contact with the lites. The assembly was allowed to cool to ambient temperature and over a period of 15 to 20 minutes the tape formed an elastomeric bond to hold the lites.

The command cure systems of the invention achieve a number of desirable benefits by applying the sealant at one time but delaying the curing until it is desirable having regard to such factors as:

a) economical scheduling of the work force,
b) complete curing of the sealant without being dependent on ambient conditions of temperature and humidity,
c) freedom to package and ship the finished insulating glass unit at a controlled time.

In this specification the expression "window glass" is intended to embrace all clear lites including conventional glass and plastic, for example, acrylate lites.

We claim:

1. A window system comprising:
a pair of generally parallel, spaced-apart glass panes, and only a flexible adhesive tape peripherally joining the glass panes to one another, the panes and said flexible adhesive tape defining between them an interpane space, said flexible adhesive tape having a shaped body portion and outer surface portions in contact with opposed inner surfaces of said panes,
said adhesive tape being transparent to curing radiation and having a thickness of up to twice its transparent depth and consisting essentially of an essentially solvent-free adhesive polymer composition, said adhesive polymer composition consisting essentially of a polymer with pendant side chains present in a predominant amount and a cross-linking agent for said polymer and being curable only while being exposed to said curing radiation to produce a cured essentially water resistant composition and having a transparent depth up to 1.0 inch, the curing of said adhesive polymer composition by said radiation being inhibited by oxygen, said composition being substantially cured throughout said body portion and uncured at said outer surface portions, such that said outer surface portions remain tacky.

2. The window system of claim 1 wherein said curing radiation is in the range from 250 nm to 400 nm, said pendant side chains have terminal vinyl groups, and said adhesive tape has a thickness in the range from 0.0625 in to 0.5 in.

3. The window system of claim 2 wherein said terminal vinyl groups are acrylate groups and said cross-linking agent is a di- or polyfunctional acrylate.

4. The window system of claim 3 wherein said acrylate polymer is derived from polymerization of at least one acrylate monomer selected from the group consisting of ethyl acrylate, butyl acrylate, 2-ethylhexyl acrylate and β-carboxylethyl acrylate with hydroxypropyl acrylate or acrylic acid.

5. A glass pane and sealant assembly for the manufacture of insulated glass window systems, said assembly comprising, only a flexible adhesive tape disposed around the periphery of said glass pane, said adhesive tape having a shaped body portion and outer surface portions in contact with opposed inner surfaces of said panes, said adhesive tape being transparent to curing radiation and having a thickness of up to twice its transparent depth and comprising an essentially solvent-free adhesive polymer composition, said adhesive polymer composition comprising a polymer with pendant side chains present in a predominant amount and a cross-linking agent for said polymer and being curable only while being exposed to said curing radiation to produce a cured essentially water resistant composition and having a transparent depth up to 1.0 inch, the curing of said adhesive polymer composition by said radiation being inhibited by oxygen, said composition being substantially cured throughout said body portion and uncured at said outer surface portions, such that said outer surface portions remain tacky.

6. The assembly of claim 5 wherein the adhesive composition is based upon a flowable polymer composition transparent to and curable by UV radiation having wavelengths between 250 and 400 nm, said adhesive layer having a thickness of about 0.0625 to about 0.5 inches.

7. The assembly of claim 6 wherein the adhesive polymer composition comprises a modified long chain adhesive polymer having a plurality of pendant side chains containing terminal vinyl groups.

8. The assembly of claim 6 wherein the terminal vinyl groups are acrylate groups and said composition further comprises a cross-linking agent comprising a di- or polyfunctional acrylate.

9. A method of bonding window panes in opposed facing relationship, comprising, introducing only a pre-shaped adhesive tape having a thickness in the range from 1.6 mm (0.0625 in) to 1.25 cm (0.5 in) near the periphery of said panes, said adhesive tape comprising a shaped body portion and at least one exposed surface portion, said tape being transparent to curing ultraviolet radiation in the range from 250 to 450 nm and comprising a solvent-free adhesive polymer of an acrylate monomer having a viscosity of at least 50,000 cps measured at 25° C., and curable in the presence of said radiation, the curing being inhibited by oxygen, said adhesive polymer being cured throughout said body portion and uncured at opposed, tacky, pane-contacting surfaces provided by said adhesive polymer effective to hold said assembly together with said panes spaced apart in said opposed facing relationship, and, subsequently, rendering said pre-shaped adhesive tape adhesively bonding at a selected time interval after formation of said assembly, by exposing said adhesive to said radiation to firmly bond together said opposed surfaces.

10. The method of claim 9 wherein said curing radiation is in the range from 250 nm to 400 nm, said pendant side chains have terminal vinyl groups, and said adhesive tape has a thickness in the range from 0.0625 in to 0.5 in.

11. The method of claim 10 wherein said terminal vinyl groups are acrylate groups and said cross-linking agent is a di- or polyfunctional acrylate.

12. The method of claim 11 wherein said acrylate polymer is derived from polymerization of at least one acrylate monomer selected from the group consisting of ethyl acrylate, butyl acrylate, 2-ethylhexyl acrylate and β-carboxylethyl acrylate with hydroxypropyl acrylate or acrylic acid.

* * * * *